No. 615,526. Patented Dec. 6, 1898.
G. O. BROSNAHAM, Jr.
FISHING REEL.
(Application filed Jan. 25, 1898.)
(No Model.)
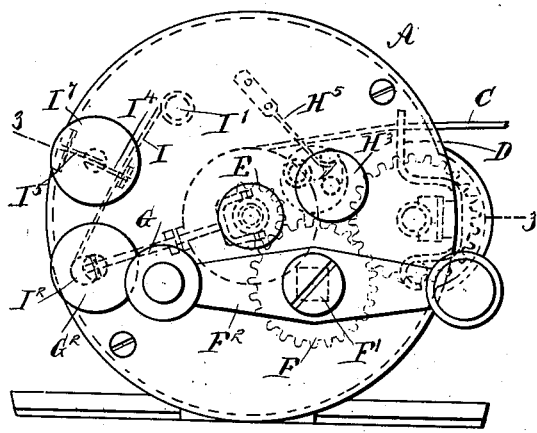
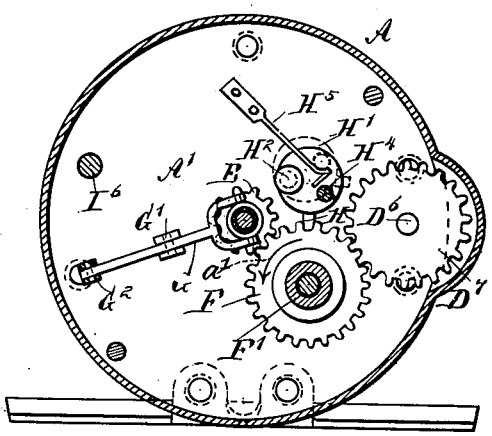
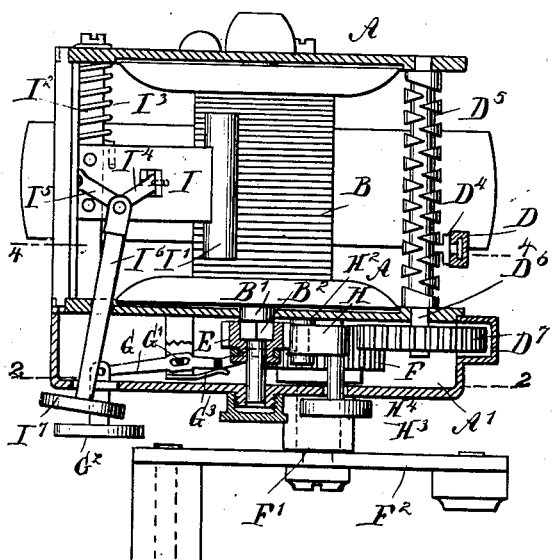
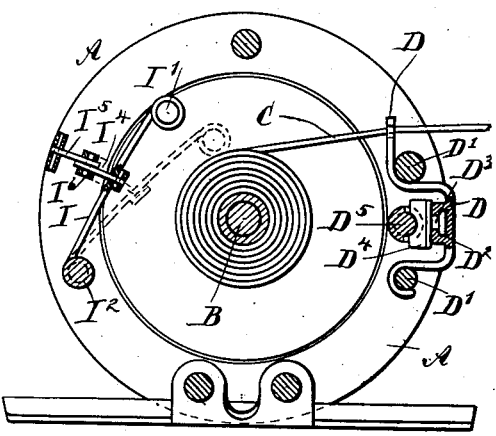
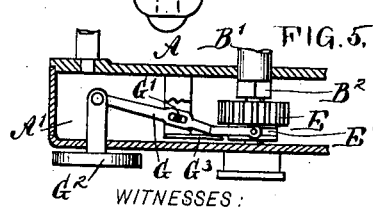
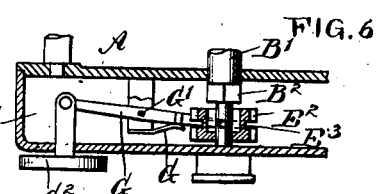
WITNESSES:
INVENTOR
BY
ATTORNEYS.

UNITED STATES PATENT OFFICE.

GEORGE O. BROSNAHAM, JR., OF PENSACOLA, FLORIDA.

FISHING-REEL.

SPECIFICATION forming part of Letters Patent No. 615,526, dated December 6, 1898.

Application filed January 25, 1898. Serial No. 667,371. (No model.)

*To all whom it may concern:*

Be it known that I, GEORGE O. BROSNAHAM, Jr., of Pensacola, in the county of Escambia and State of Florida, have invented a new and Improved Fishing-Reel, of which the following is a full, clear, and exact description.

The object of the invention is to provide a new and improved fishing-reel which is simple and durable in construction and arranged to permit a fisherman to readily apply the brake whenever necessary, to wind up the line evenly on the spool and permit the latter to run easily when quickly unwinding the line, and also to enable the operator to quickly stop the unreeling of the line when casting and prevent overlapping of the line.

The invention consists of novel features and parts and combinations of the same, as will be hereinafter described, and pointed out in the claims.

Reference is to be had to the accompanying drawings, forming a part of this specification, in which similar characters of reference indicate corresponding parts in all the figures.

Figure 1 is a side elevation of the improvement. Fig. 2 is a sectional side elevation of the same on the line 2 2 of Fig. 3. Fig. 3 is a sectional plan view of the same on the line 3 3 of Fig. 1. Fig. 4 is a sectional side elevation of the same on the line 4 4 of Fig. 3. Fig. 5 is a sectional plan view of the mechanism for throwing the reel out of gear. Fig. 6 is a similar view of a modified form of the same. Fig. 7 is a sectional side elevation of the same, and Fig. 8 is a side elevation of the shifting-lever ring.

The improved fishing-reel is provided with a suitably-constructed casing A, on one side of which is formed a gear-chamber A', as plainly illustrated in the drawings, and in the said casing is journaled a reel B, on which winds and unwinds a line C, one end of which passes through a guide-arm D, arranged to travel laterally in the manner hereinafter more fully described, so as to insure an even winding of the line on the spool B. The shaft B' of said spool B is formed near one end and within the chamber A' with a square offset $B^2$, adapted to be engaged by a corresponding aperture in the hub of a pinion E, normally in mesh with a gear-wheel F, secured on a shaft F', journaled in suitable bearings in the chamber A' and carrying at its outer end a crank $F^2$ for conveniently turning the shaft F' and gear-wheel F to rotate the pinion E and spool B and wind up or unwind the line C.

The pinion E is fitted to slide on the end of the shaft B', and for this purpose the hub of the pinion E is provided with a loose ring E', engaged by a shifting-lever G, fulcrumed at G' on a bracket secured to the chamber A'. The free end of said lever G is provided with a finger-piece $G^2$, extending to the outside of the chamber, to be within convenient reach of the finger of the operator holding the reel. A spring $G^3$ presses on the shifting-lever G, so as to hold the lever and the pinion E normally in the position shown in Fig. 3—that is, with the pinion E in engagement with the square offset $B^2$ and in mesh with the gear-wheel F.

Now when the operator presses the finger-piece $G^2$ a swinging motion is given to the lever G and the pinion E is moved out of engagement with the square offset $B^2$ to rotate loosely on the end of the shaft B'. The spool B is now free to revolve irrespective of the gearing above mentioned.

In order to quickly stop the spool against unwinding of the line while the gearing is on, I provide a tooth H on the peripheral surface of a wheel H', mounted eccentrically on a stud $H^2$, carried by the chamber A'. A handle $H^3$ is connected with the wheel H' and extends to the outside of the casing A, the shank $H^4$ of said handle being movable in a segmental slot in the front plate of the chamber. A spring $H^5$, attached to the inside of the chamber, is adapted to engage the shank $H^4$ when the wheel H' is in a normal position, as indicated in dotted lines in Fig. 2, to hold the tooth H out of mesh with the gear-wheel F.

In casting the operator swings the handle $H^3$ downward, so that the shank $H^4$ passes the spring $H^5$ and the tooth $H^4$ meshes with the gear-wheel F to prevent the latter from rotating in the direction of the arrow $a'$, but to allow rotation in the inverse direction of said arrow. The operator now pushes the finger-piece $G^2$ inward to allow the spool B to revolve freely and then casts the line, and when he wishes to stop the line he releases the finger-piece $G^2$ to allow the clutch-pinion E to again contact with the spool, thereby instantly stopping the spool by the locked gear, so that the end of the line draws by the movement of the weight on the end of the line to prevent overlapping of the line. When the tooth is in the position described, it will not interfere with the winding up of the line on the spool, but will prevent unwinding of the line.

The brake mechanism for the spool and line is provided with a lever I, formed at its free end with a transversely-extending shoe I', adapted to engage the line as it unwinds on the spool. The lever I has its fulcrum I² in the form of a shaft journaled in suitable bearings in the casing A, and a torsion-spring I³ connects with the lever I, so as to hold the same normally in an outermost position—that is, with the brake-shoe I' out of engagement with the line C, as indicated in Fig. 4. The brake-lever I is pivotally connected by a link I⁴ with a transversely-extending rod I⁶, also pivotally connected at its inner end with a link I⁵, fulcrumed on the casing A, the links I⁴ I⁵ forming toggle-links for swinging the lever I downward and bringing the shoe I' in engagement with the line C on the spool B to brake the latter and the line. The rod I⁶ extends through suitable bearings in the casing A and chamber A' to carry at its outer end a finger-piece I⁷, arranged in close proximity to the finger-piece G², so that both can be conveniently pressed on by the operator's finger whenever desired to apply the brake and to ungear the spool, as previously explained. As soon as the operator releases the pressure on the finger-piece I⁷ the lever I returns to its normal inactive position, owing to the action of the spring I³, as previously explained.

The guide D for the line C is mounted to slide transversely on guide-bars D', and said guide is provided with a dovetailed block D², (see Fig. 4,) engaging a dovetailed tongue D³, secured on a half-nut D⁴, in mesh with the right and left hand threaded screw-spindle D⁵, carrying on its shaft D⁶ a gear-wheel D⁷, in mesh with the gear-wheel F. When the latter is rotated, a continuous rotary motion is given to the gear-wheel D⁷ and the screw-spindle D⁵, and consequently the nut D⁴ is caused to travel transversely, and as it carries along the guide D the latter causes an even winding and placing of the line C on the spool B, so as to properly wind the line evenly in uniform layers. The screw-spindle D⁵ and its half-nut D⁴, with the guide D, can be actuated at the time the pinion E is out of mesh with the gear-wheel F and the spool B, so as to guide the line when the spool is free and is unwinding by a pull exerted on the line by the hooked fish.

As shown in Fig. 6, the pinion E² may be formed in its peripheral surface with an annular groove E³, engaged by the shifting-lever G, so as to move the pinion E in and out of mesh with the square portion B² of the spool-shaft B'. The action, however, is the same as above described.

Now it will be seen that by the arrangement set forth and as shown in the drawings the line is evenly wound on the spool and is free to run off quickly and easily when the gearing is thrown off. Said arrangement also enables the operator to quickly stop the unreeling of the line when casting, so as to prevent overlapping of the line, as explained.

Having thus fully described my invention, I claim as new and desire to secure by Letters Patent—

1. A fishing-reel having a gear-wheel connected to revolve with the reel, a swinging locking member adapted to engage the gear-wheel to prevent its turning in one direction and means for making and breaking the connection of the gear-wheel with the reel at will.

2. A fishing-reel having a gear-wheel connected to revolve with the reel, a swinging locking member adapted to engage the gear-wheel to prevent its turning in one direction, a spring acting on said swinging member to hold it in either adjusted position, an exteriorly-projecting handle on the swinging member, and means for making and breaking the connection of the gear-wheel with the reel at will.

3. A fishing-reel having a gear-wheel connected to revolve with the reel, a swinging locking member adapted to engage the gear-wheel to prevent its turning in one direction, a spring acting on said swinging member to hold it in either adjusted position, an exteriorly-projecting handle on the swinging member, a clutch mechanism connecting the gear-wheel with the reel, and a shifting-lever therefor having a finger-piece projecting from the case whereby the reel may be freed or locked at will.

4. A fishing-reel provided with a line-guide mounted to slide transversely on the reel-casing, a nut on said guide, a revoluble double-thread screw-rod for moving the nut and its guide transversely, and means for rotating said screw-rod independently of the spool, substantially as shown and described.

5. A fishing-reel provided with a brake comprising a spring-pressed lever carrying a brake-shoe for engaging the line on the spool, toggle-links, one of which is connected with the lever and the other is fulcrumed on a fixed point, and an operating-rod connected with the said links, substantially as shown and described.

GEORGE O. BROSNAHAM, JR.

Witnesses:
W. DE C. KESSLER,
JAS. B. ROBERTS, Jr.